INVENTOR.
EDMOND P. DI CAMBIO

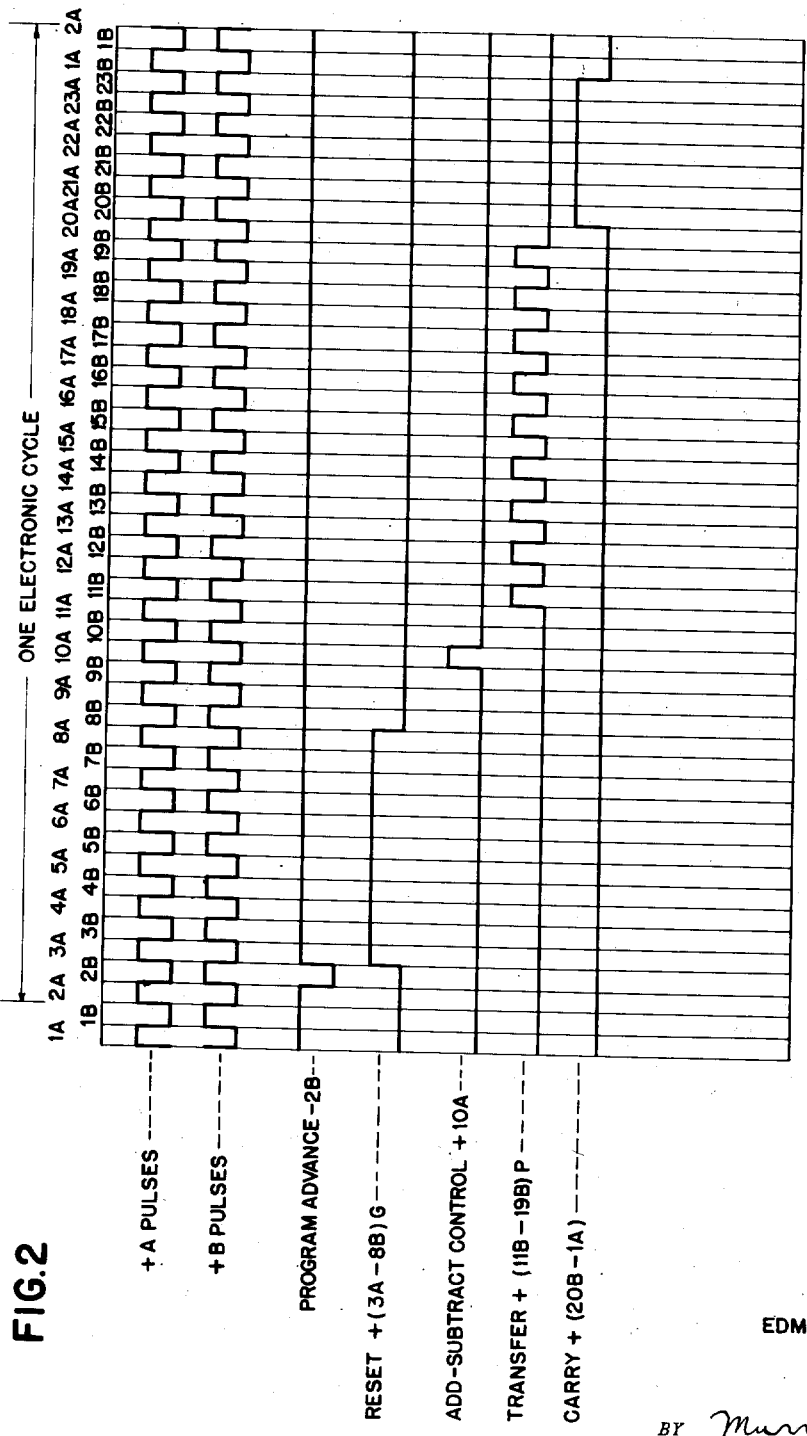

BY Murray Names
ATTORNEY

May 21, 1957  E. P. DI CAMBIO  2,792,991
ELECTRONIC COMMUTATOR FOR CALCULATORS
Filed Nov. 23, 1953  9 Sheets-Sheet 6

INVENTOR.
EDMOND P. DI CAMBIO

BY Murray Nauss
ATTORNEY

May 21, 1957   E. P. DI CAMBIO   2,792,991
ELECTRONIC COMMUTATOR FOR CALCULATORS
Filed Nov. 23, 1953   9 Sheets-Sheet 7

*INVENTOR.*
EDMOND P. DI CAMBIO

BY Murray Nanes
*ATTORNEY*

*INVENTOR.*
EDMOND P. DI CAMBIO

BY Murray Nanes
*ATTORNEY*

May 21, 1957  E. P. DI CAMBIO  2,792,991
ELECTRONIC COMMUTATOR FOR CALCULATORS
Filed Nov. 23, 1953  9 Sheets-Sheet 9
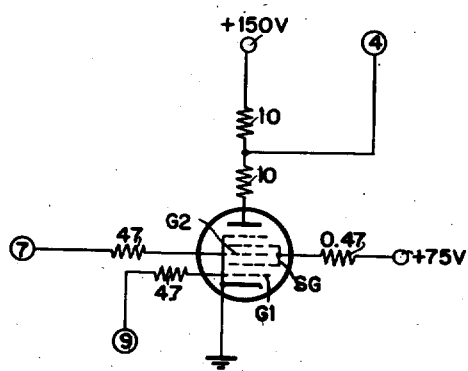
FIG.21
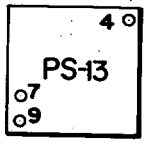
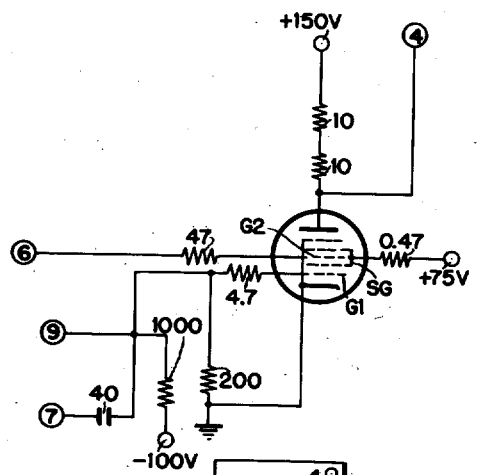
FIG.22
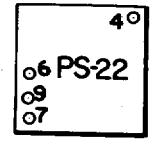
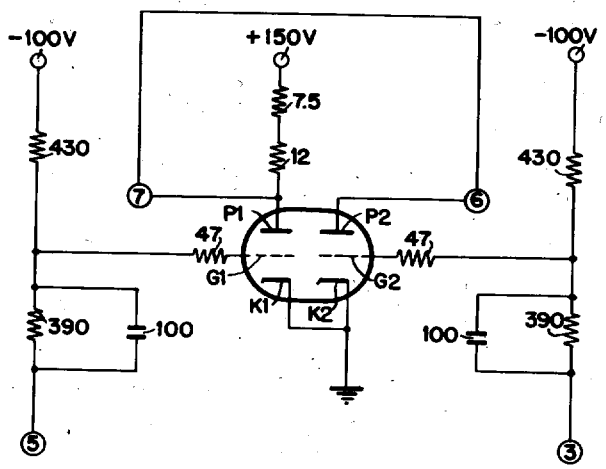
FIG.23
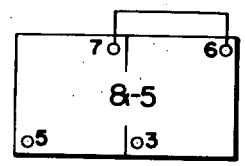
*INVENTOR.*
EDMOND P. DI CAMBIO
BY *Murray Naves*
ATTORNEY

United States Patent Office 2,792,991
Patented May 21, 1957

2,792,991

ELECTRONIC COMMUTATOR FOR CALCULATORS

Edmond P. Di Cambio, Poughkeepsie, N. Y., assignor to International Business Machines Corporation, New York, N. Y., a corporation of New York Application November 23, 1953, Serial No. 393,840

13 Claims. (Cl. 235—61)

This invention relates to calculator programming and more particularly to high speed skipping of program steps in an electronic commutator type program control unit.

In the patent to R. L. Palmer et al., 2,658,681, issued November 10, 1953, there is disclosed a combination of machines, for carrying out complex calculations, consisting of an electronic calculator and a summary punch. The calculator includes as certain elements thereof, a number of electronic storage units, an electronic accumulator and a program unit. The summary punch, in addition to its punching functions, is employed to read cards and feed the factors taken therefrom into these electronic storage units. The entry and exit positions of all these storage units and of the accumulator are internally commonly connected to an entry channel and an exit channel, respectively, the factors being transferred via these channels from the storage units to the accumulator or vice versa under control of the program unit, which controls the transfers, in a desired sequence. All calculations take place in the accumulator, which during multiplication and division acts jointly with a multiplier-quotient unit. The results are then read out from the calculator to the summary punch where they are punched in the same record cards from which the original factors were read.

The program unit of the calculator supplies a series of sequential voltages to output hubs which thus indicate which program step is On and activates any program functions which may be plug wired to the hubs. The program unit is an open electronic ring, which advances, one step at a time, and shuts itself off after running its course of steps. The length of one program step, except when multiplying or dividing, is one cycle of a primary timer electronic ring. The program ring is stepped along by pulses from this primary timer which comprises a closed electronic ring, that advances, step by step, to the last stage and then repeats its operation.

More specifically, the primary timer, is advanced from its first position by pulses from a multivibrator, and each time the timer reaches its second step, it emits a pulse, which advances the program ring one step. The primary timer ring, in addition to driving the program open ring, controls circuits which develop gating pulses and other pulses for determining the sequence of operation, within a particular program step. These gating pulses are not developed until the "active" portion, of the primary timer cycle, which active portion, it should be particularly noted, does not begin until the third primary timer step.

In the calculator disclosed in said Palmer et al. patent, the program unit is (with the exception noted in said application) inflexible, in that once it is pluggably wired, for a desired sequence, it must continue through and actually carry out the steps of that particular sequence for which it was plugged. The present invention provides an extremely flexible combination of multivibrator, primary timer, and program unit in which a novel high speed skip-circuit is provided, which circuit is controlled, in a novel manner, to determine whether subsequent multivibrator pulses will advance the primary timer ring, to the third step, which, as stated above, initiates the "active" portion of the cycle, or whether the advancement of the primary timer ring will be suspended, on the second or inactive step, while the program ring is advanced without performing any program function.

This novel skip-circuit, and associated control circuits therefor, advance the program ring, at an increased rate, through one or more program steps, without carrying out the detailed operations of the particular program functions for which these particular steps are pluggably wired.

The principal object of this invention, therefore, is to provide a more flexibly operable calculator program unit, for a computer such as is disclosed in said above mentioned application and to provide a more flexibly operable program unit for any program controlled system.

Another object is to provide a circuit capable of skipping, one or more predetermined consecutive program steps, in a pluggably wired type of calculator program, said skipping being accomplished, at a rate more rapid than other skipping circuits.

A further object is to provide a calculator adaptable to advance past one or more groups of consecutive program steps without taking the full time that is ordinarily required for these steps to perform their functions.

Still another object is to provide in a calculator, a multivibrator which advances a primary timer electronic ring, which in turn advances a program electronic ring, and means for advancing the program electronic ring directly, by the multivibrator, to increase the rate of advancement of the program ring.

Another object is to provide, in a calculator primary timer ring, a stepping element to advance a program ring, and means operative for selectively halting the primary timer, at the stepping element, to effect an acceleration of the advancements of the program function.

This novel skip-circuit, and associated control circuits therefor, advance the program ring, at an increased rate, through one or more program steps, without carrying out the detailed operations of the particular program functions for which these particular steps are pluggably wired.

The principal object of this invention, therefore, is to provide a more flexibly operable calculator program unit, for a computer such as is disclosed in said above mentioned application and to provide a more flexibly operable program unit for any program controlled system.

Another object is to provide a circuit capable of skipping, one or more predetermined consecutive program steps, in a pluggably wired type of calculator program, said skipping being accomplished, at a rate more rapid than other skipping circuits.

A further object is to provide a calculator adaptable to advance past one or more groups of consecutive program steps without taking the full time that is ordinarily required for these steps to perform their functions.

Still another object is to provide in a calculator, a multivibrator which advances a primary timer electronic ring, which in turn advances a program electronic ring, and means for advancing the program electronic ring directly, by the multivibrator, to increase the rate of advancement of the program ring.

Another object is to provide, in a calculator primary timer ring, a stepping element to advance a program ring, and means operative for selectively halting the primary timer, at the stepping element, to effect an acceleration of the advancements of the program ring without progressing to the active portion of the primary timer ring during which calculations occur.

A further object is to provide in combination, a calculator program ring selectively operable to quickly skip or not skip a group of program steps and means controlled by test means, operable in a previous program step, for selectively producing or not producing said rapid skipping.

Another object is to provide means for selectively advancing an electronic ring at a rate more rapid than its normally fixed rate of advancement.

Other objects of the invention will be pointed out in the following description and claims and illustrated in the accompanying drawings, which disclose by way of example, the principle of the invention and the best mode which has been contemplated of applying that principle.

In the drawings:

Figs. 1A, 1B and 1C arranged in a horizontal sequence from left to right in that order, comprise a complete wiring diagram showing a portion of a computer embodying the preferred form of the invention.

Fig. 2 is a timing chart illustrating primary timer pulses and the timing of machine function pulses.

Figure 1A:
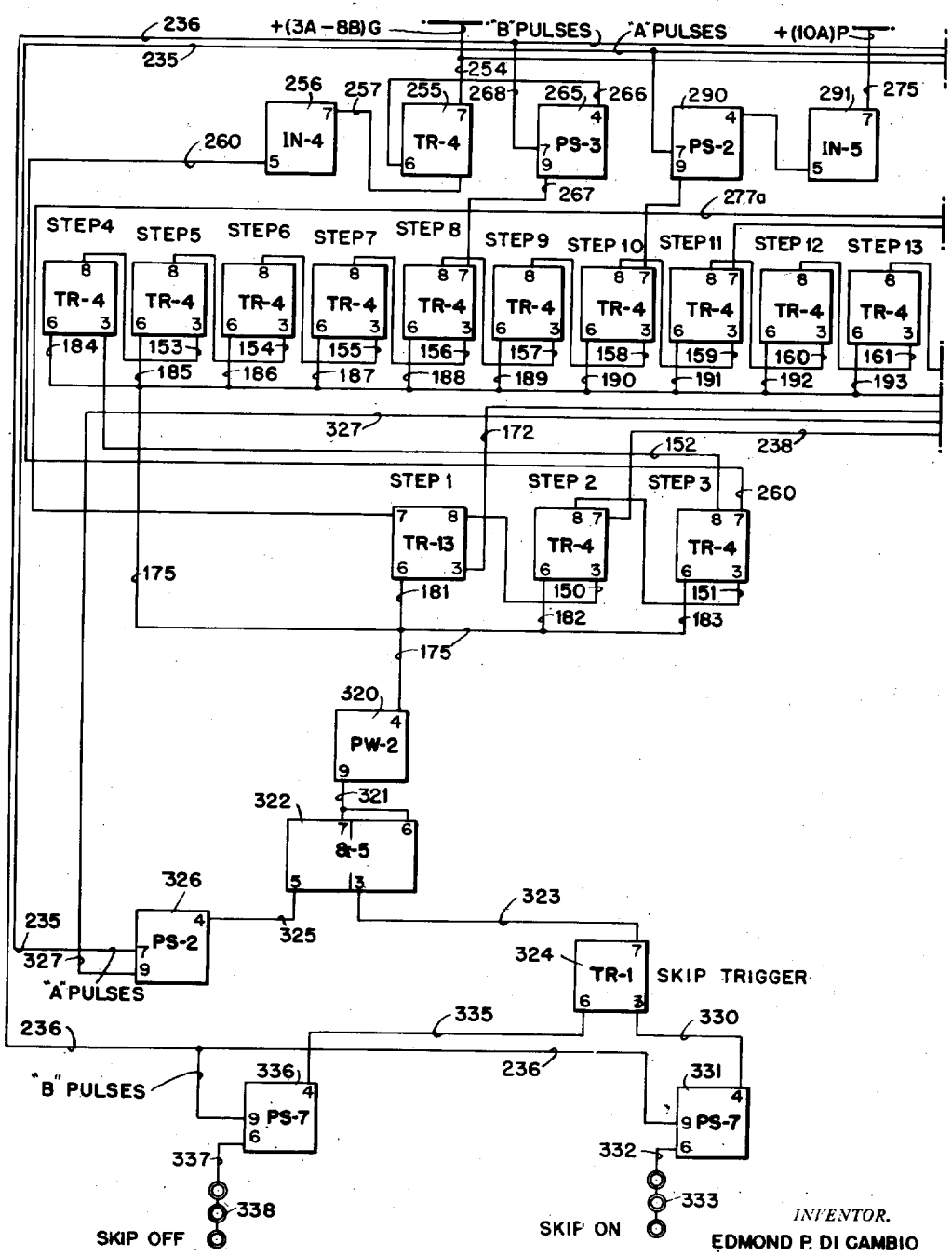

Figs. 7, 8, 9, 10, and 11 are detailed circuit diagrams and the respective block representations of electronic triggers employed in the invention.

Figs. 12, 13, 14, 15 and 16 are detailed circuit diagrams and the respective block representations of inverter circuits employed in the invention.

Figs. 17 to 22 are detailed circuit diagrams and the block representations of electronic pentagrid switching circuits employed in the invention.

Fig. 23 is a detailed circuit diagram and the corresponding block representation of an electronic tube "And" circuit employed in the invention.

Wherever shown, unless otherwise indicated in the drawings, the values, for the various resistors and condensers, are in thousands of ohms and micromicrofarads, respectively. For example, a resistor labeled 200 indicates a 200K (200,000) ohm resistor; a condenser labeled 100 indicates a 100 micromicrofarad condenser.

The terms "positive" and "negative" potentials used in the discussion of the circuits, refer to relative values rather than values with respect to ground.

The novel high speed skip-circuit is embodied in the programming portion of a calculator but it is to be expressly understood that the use of this novel circuit as part of a programming device and in conjunction with a calculator is illustrative only in order to clearly point out one precise mode of operation of the invention.

Figure 1B:
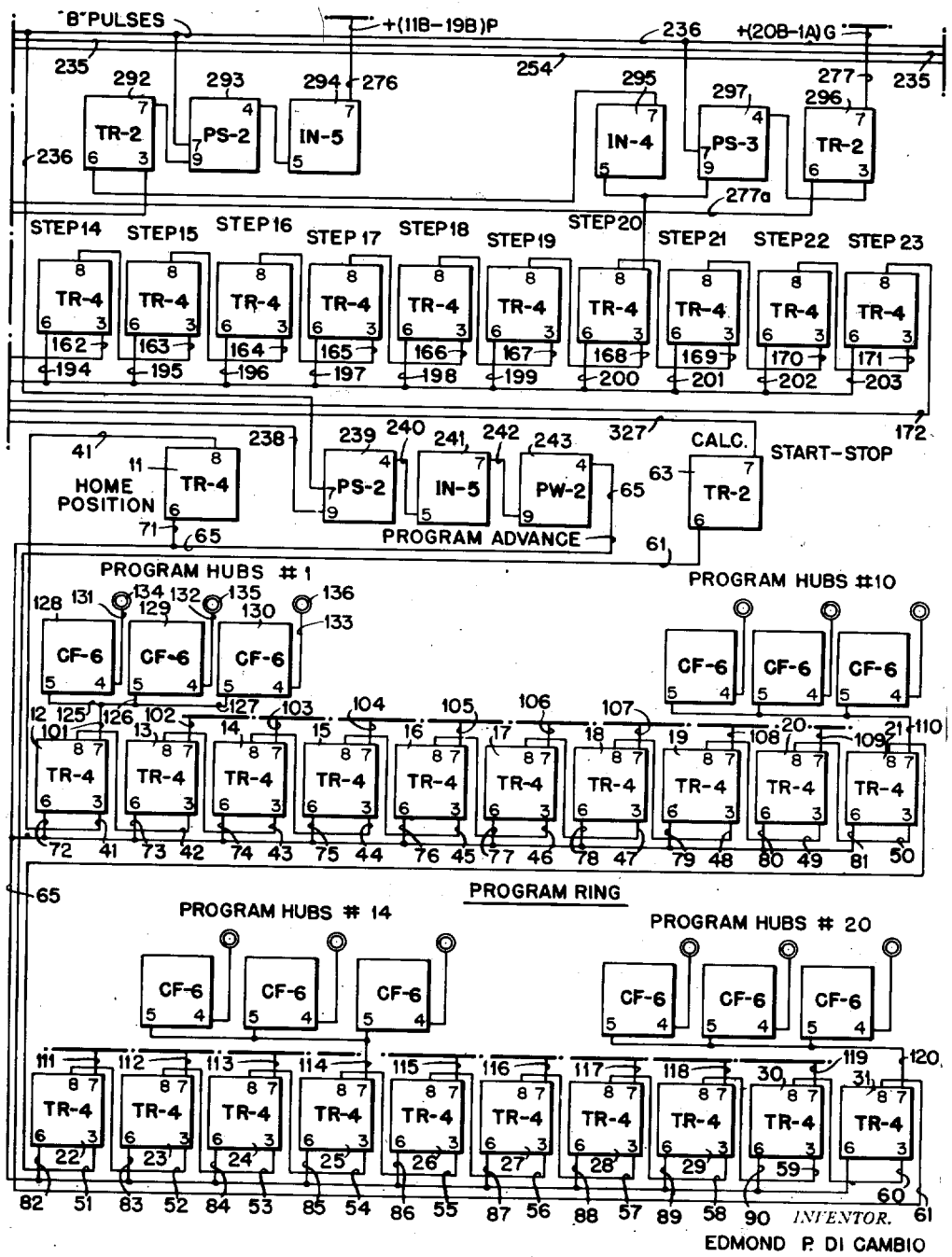
Figure 1C:
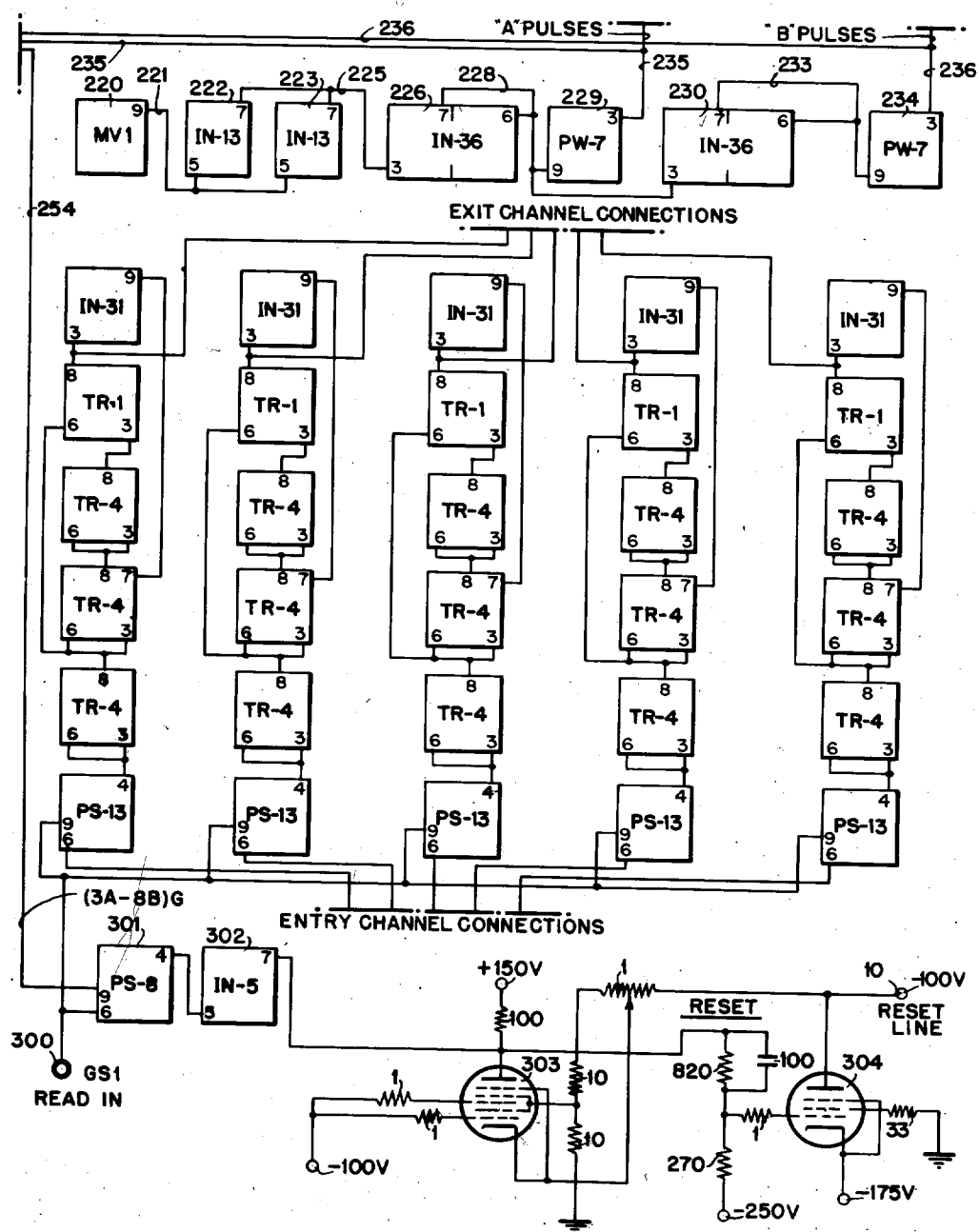

Referring generally to Figs. 1A, 1B and 1C of the drawings, it will be seen that the different elements comprising the invention are represented by blocks, whose contents are illustrated in other figures of the drawings, the inputs and outputs only being indicated in Figs. 1A, 1B and 1C. Before proceeding with a description of the program circuit and its novel associated high speed skip-circuit, a detailed description of the respective elements, such as the multivibrator, cathode followers, power tubes, triggers, inverters, pentagrid switches and "And" circuits, will be given. The contents of the respective blocks and the respective block representations are shown in Figs. 3 to 23.

Multivibrator

Figure 3:
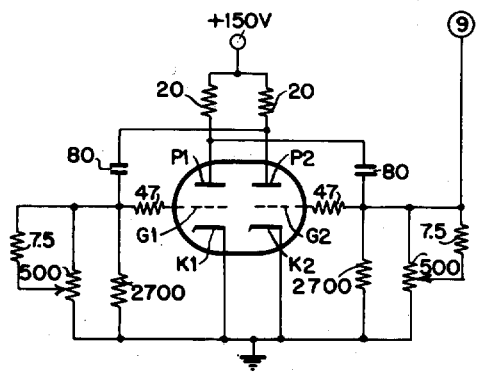
Fig. 3 is a detailed circuit diagram of a multivibrator employed in the invention and its corresponding block representation.

In Fig. 3, there is shown a type of multivibrator whose block symbol is labeled MV–1. This multivibrator comprises, for example, a type 6J6 dual triode tube having two triodes in one envelope. Two such triodes with normally conducting grids, when retroactively capacity coupled will oscillate in a manner now well known in the art. This device is called a multivibrator and in the present invention is used as the parent source of square pulses supplied to the calculator.

Referring to Fig. 3, plate P1 of the left hand triode is coupled via an 80 micro-microfarad condenser, in series with a 47K ohm resistor to a grid G2 of the right hand triode. Connected between ground and the junction of this condenser and resistor are a 500K ohm potentiometer, in parallel with a 2700K ohm resistor. A 7.5K ohm resistor is connected between the same junction and a tap on the 500K ohm potentiometer. Plate P1 of the left hand triode is connected via a 20K ohm resistor to a +150 volt source while plate P2 of the right hand triode is connected to the same +150 volt source through another 20K ohm resistor. Cathodes K1 and K2 are commonly connected to ground. Plate P2 is coupled to grid G2 by an 80 micro-microfarad condenser in series with a 47K ohm resistor. Connected between ground and the junction of this condenser and resistor are a 500K ohm potentiometer, in parallel with a 2700K ohm resistor. A 7.5K ohm resistor is connected between this latter junction and a tap on the 500K ohm potentiometer. The frequency of the multivibrator can be set to 50 kc. by varying the taps on the two 500K ohm potentiometers and the square wave output is taken from output "terminal 9," which is connected as shown.

Triggers

Referring to Figs. 7 to 11, inclusive, the details of several electronic triggers are shown, designated respectively TR–1 through TR–4 and TR–13, which are commonly known in the art as the Eccles-Jordan type trigger. These each comprises two cross-coupled triodes (which may be included in one envelope, such as, for example, a type 6J6 tube) in which a plate P1 of a left hand triode is coupled by means of a 200K resistor in series with a 1K ohm resistor to the grid G2 of a right hand triode and plate P2 of a righthand triode is likewise coupled to the grid G1 of the left hand triode by a 200K ohm resistor in series with a 1K ohm resistor, each of these 200K ohm resistors being shunted by a 100 micro-microfarad condenser, as shown. Grid G1 is connected via the 1K ohm resistor, in series with another 200K ohm resistor, to a terminal "5" and through the same 1K ohm resistor, in series with a 40 micro-microfarad condenser, to an input terminal "6." Grid G2 is connected by identical circuitry to a terminal "4" and to an input terminal "3." Plates P1 and P2 of all the triggers are similarly connected to a +150 volt power supply via pairs of 12K ohm and 7.5K ohm resistors, in series, as shown. The cathodes K1 and K2 of all the triggers are grounded, as shown.

Trigger TR–2 has a 10 micro-microfarad condenser connected between the input circuits, as shown, in order to obtain more stabilized operation; the condenser tending to prevent operation by transient pulses.

The triggers differ from each other mainly in the specific connections of the output terminals. In triggers TR–1 and TR–2 (Figs. 7 and 8, respectively), a terminal "8" is directly connected to P1 while a terminal "7" is directly connected to plate P2, as shown.

In trigger TR–3 (Fig. 9) a terminal "7" is connected to plate P1 and a terminal "8" is connected to the tap between the plate resistors of plate P2.

In trigger TR–4 (Fig. 10) a terminal "7" is directly connected to plate P2 and a terminal "8" is connected to the tap between the 7.5K ohm resistor and the 12K ohm resistor of plate P2.

In trigger TR–13 (Fig. 11) a terminal "7" is connected to the tap between the 7.5K ohm resistor and the 12K ohm resistor of plate P1 while a terminal "8" is connected to the top between the 7.5K ohm and the 12K ohm resistors of P2.

As is now well known in the art, such triggers have two conditions of stability. When the left hand triode of the trigger is conducting, the voltage at plate P1, with the circuit values indicated, is lowered from approximately plus 140 volts to approximately plus 40 volts, which, through the coupling previously described, maintains the grid G2 relatively negative, so that the right hand triode is blocked when the left hand triode conducts. Thus, when P1 and its corresponding output is negative, P2 and its corresponding output is positive. This comprises one state of stability of the trigger, and will hereinafter be designated as the On condition. In a similar manner, if the right hand triode is conducting, the reduction in voltage on the plate P2 is applied by the coupling connection, previously described, to the grid G1, to thus block the left hand triode so that P1 and its corresponding left hand output now becomes positive and this condition will hereinafter be designated as the Off condition.

If, for example, the right hand triode is conducting (trigger Off), a negative voltage applied to its grid G2 via input terminal "3," for example, will flip the trigger On, by blocking the right hand triode and thus rendering the left hand side conductive. Likewise, if the left hand triode is conducting (trigger On), a negative voltage applied to its grid G1, via input terminal "6," for example, blocks the left hand side of the tube thus flipping the trigger Off. The above two methods are normally used for flipping the triggers On and Off.

In the operation of the invention, it is required that some of the triggers be reset On and others reset Off, before the start of an operation. To reset a trigger On, a sufficiently positive voltage is applied to grid G1 to cause the left hand side of the 6J6 tube to conduct. The triggers used are so designed that a positive shift applied to either input terminal "6" or to terminal "3" and through the 40 micromicrofarad condenser, to the grids will not flip the triggers. However, by applying a positive voltage, conductively through terminal "5" or "4" and through the corresponding resistor, to one of the grids, the trigger will be reset. In triggers which are to be reset On, terminal "4" is connected to a —100 volt negative bias supply, and terminal "5" is connected to a "—100 volt reset" terminal 10 (Fig. 1C) which is then shifted from —100 volts to ground potential (relatively plus), in a manner referred to later, when it is desired to reset the trigger, ground potential being sufficiently positive to thus render the left hand triode conductive, thus resetting the trigger On.

In triggers, which are to be reset Off, it is the terminal "4" which is connected to the "—100 volt reset" terminal 10 (Fig. 1C) while terminal "5" is connected to the —100 volt negative bias supply, so that when the "—100 volt reset" terminal 10 is shifted to ground potential, the right hand triode is rendered conductive, thus resetting the trigger Off.

*Inverters*

Inverter circuits, designated IN-4, IN5, IN-13, IN-31 and IN-36, respectively, are illustrated in Figs. 12 through 16 respectively. The function of an inverter is to take a positive voltage supplied to its input terminal and produce a negative voltage at its output terminal. Conversely, negative inputs produce positive outputs.

Each inverter employed may comprise one half of a dual triode type 6J6 tube, except that the inverter IN-36 (Fig. 16) employs both halves of the dual triode as illustrated. The cathode of all the inverters are connected to ground, as shown.

In inverters IN-4 and IN-5 (Figs. 12 and 13, respectively), the grid is connected, via a 47K ohm resistor and a 430K ohm resistor, to a source of —100 volts and is also connected to an input terminal "5" through the same 47K ohm resistor, in series with a 390K ohm resistor, shunted by a 100 micro-microfarad condenser, as shown. The plate is connected to a plug 150 volt power supply through 12K ohm and 7.5K ohm resistors, in series. IN-4 differs from IN-5 in that the output terminal "7" of IN-4 is connected to the junction of the 7.5K ohm and the 12K ohm resistors, while inverter IN-5 has its output terminal "7" connected directly to the plate.

Inverter IN-13 (Fig. 14) is similar to inverter IN-5, except that its input terminal "5" is connected, directly to the control grid through a 47K ohm resistor, and no negative bias supply is provided.

Inverter IN-31 (Fig. 15) has an input terminal "3" which is coupled to the grid of the triode through a 25 micro-microfarad condenser and a 1K ohm resistor. A —100 volt source is applied to one end of a 510K ohm resistor, connected at its other end to a 39K ohm resistor, which in turn is connected to ground. The junction of the 510K ohm resistor and the 39K ohm resistor is connected, via the above mentioned 1K ohm resistor, to the grid of the triode, whose plate is connected directly to an output terminal "9."

In inverter IN-36 (Fig. 16) a —100 volt source is applied to one end of a 430K ohm resistor whose other end is connected, via a 390K ohm resistor shunted by a 100 micro-microfarad condenser, to a terminal 3. The junction of the 430K ohm resistor and the 390K ohm resistor is connected, via one 47K ohm resistor, to the grid G1 and via another 47K ohm resistor, to the grid G2. Plate P1 of the left hand triode is connected directly to an output terminal "7" and is also connected, via a 12K ohm and a 7.5K ohm resistor, in series, to a plus 150 volt supply, while plate P2 of the right hand triode is connected directly to an output terminal "6" and is also connected, via a 12K ohm and 7.5K ohm resistor, in series, to the plus 150 volt supply.

*Pentagrid switches*

Figs. 17 through 22, respectively, illustrate the detailed circuitry of different electronic switching circuits and their respective blocks PS-2, PS-3, PS-7, PS-8, PS-13, and PS-22. Each electronic switching circuit may employ a pentagrid tube of the 6BE6 type.

Each of these switches requires simultaneously applied positive voltages, at the respective input terminals, connected to their grids G1 and G2, in order to cause conduction of the respective tube, so that a negative output is produced, when and only when, both inputs are positive.

Each pentagrid tube has its cathode grounded, as shown, and its suppressor grid directly connected to the cathode. The screen grid SG of each pentagrid switch is connected, via a 0.47K ohm resistor, to a source of plus 75 volts.

The grid G1 of pentagrid switch PS-2 (Fig. 17) is shown as connected, by means of a 47K ohm resistor in series with a 430K ohm resistor, to a voltage source of —100 volts and is also coupled through the same 47K ohm resistor, in series with a 390K ohm resistor, shunted by a 100 micro-microfarad condenser, to an input terminal "9." Grid G2 is connected through a 47K ohm resistor, in series with another 430K ohm resistor, to said source of —100 volts and is also coupled through the same 47K ohm resistor, in series with another 390K ohm resistor, shunted by a 100 micro-microfarad condenser, to an input terminal "7." The plate of switch PS-2 is connected through a 12K ohm and 7.5K ohm resistors, in series, to a plus 150 volt supply. An output terminal "4" is connected directly to the plate.

Switch PS-3 (Fig. 18) is exactly like switch PS-2, except that it has two 10K ohm resistors, in series, connecting its plate to the plus 150 volt supply and its output terminal "4" connected to the junction of the two 10K ohm resistors.

Figure 19:
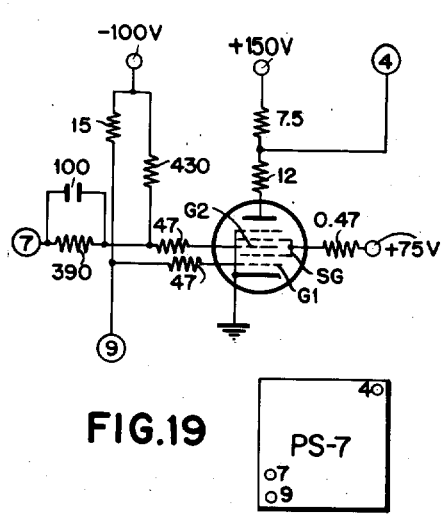
Figure 20:
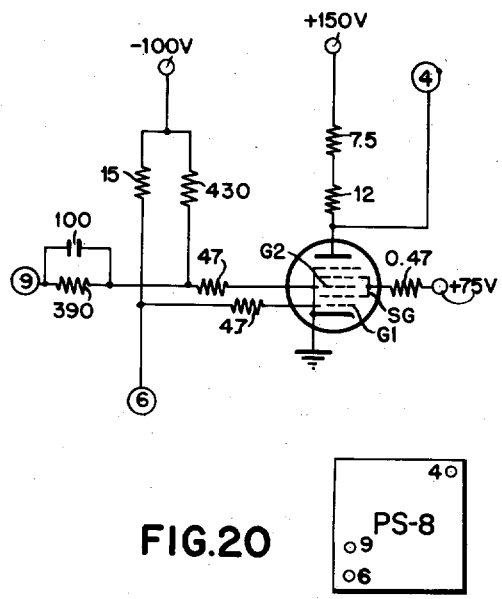

Switches PS-7 and PS-8 of Figs. 19 and 20, respectively, each has its plate connected through a 12K ohm and 7.5K ohm resistors, in series, to plus 150 volt supply. The output terminal "4" of switch PS-7 (Fig. 19) is a tapped output connected between the 12K ohm and 7.5K ohm plate resistors. The other pentagrid switch PS-8

(Fig. 20), has its output terminal "4" connected directly to its plate.

Grid G1 of the switch PS-7 is connected, through a 47K ohm resistor to an input terminal "9" and said grid G1 is also connected, via the same 47K ohm resistor and a 15K ohm resistor, in series, to a —100 volt negative bias supply. Grid G2 is connected through a 47K ohm resistor, in series with a 430K ohm resistor, to the —100 volt bias supply. Grid G2 is also connected through the same 47K ohm resistor and a 390K ohm resistor, shunted by a 100 micromicrofarad condenser, to an input terminal "7".

Switch PS-8 is exactly like switch PS-7, except that its output terminal "4" is connected directly to the plate.

Switches PS-13 and PS-22 of Figs. 21 and 22, respectively, each has its plate connected through two 10K ohm resistors, in series, to plus 150 volts supply. The output terminal "4" of switch PS-13 is a tapped output, connected between the two 10K ohm plate resistors. The other pentagrid switch PS-22 has its output terminal "4," connected directly to its plate.

Grid G1 of the switch PS-13 is connected, through a 4.7K ohm resistor, to an input terminal "9." Grid G2 of the switch PS-13 is connected through a 47K ohm resistor, to an input terminal "7."

Grid G1 of the switch PS-22 (Fig. 24) is connected through a 4.7K ohm resistor, to an input terminal "9" and from there, through a 40 micro-microfarad condenser, to an input terminal "7." Grid G1 is connected to ground, via said 4.7K ohm resistor and a 200K ohm resistor and is negatively biased, through said 4.7K ohm resistor, connected in series with a 1000K ohm resistor, to a source of —100 volts. Grid G2 is connected, through a 47K ohm resistor, to an input terminal "6."

Cathode follower

Figure 4:
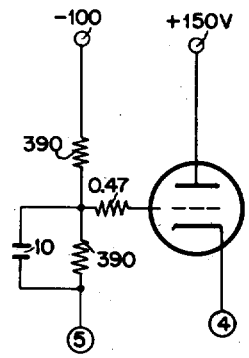
Fig. 4 is a detailed circuit diagram and corresponding block representation of a cathode follower employed in the invention.

Referring to Fig. 4, there is illustrated therein, a type of cathode follower whose block symbol is labeled CF-6, which comprises a single triode which may actually be one only, of the two triodes of a dual triode 12AV7 type tube. A cathode follower may be defined as a vacuum tube circuit in which the input signal is applied between the control grid and ground, but the output, instead of being taken from the plate, is taken from between the cathode and the cathode load circuit, which may comprise a resistor in another circuit, for example. The cathode follower has a high input impedance, but a low output impedance and is capable of producing a power gain, without a voltage inversion. The grid of the triode (Fig. 4) is connected through a 0.47K ohm resistor, in series with a 390K ohm resistor, to a negative bias supply of —100 volts and is also connected through the same 0.47K ohm resistor, in series with another 390K ohm resistor, shunted by a 10 micro-microfarad condenser, to an input terminal "5." The plate is directly connected to a plus 150 volt power supply and the cathode, as shown, is connected to an output terminal labeled "4."

Power tubes

Figure 5:
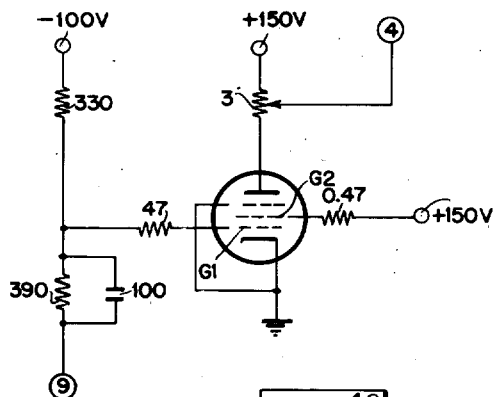
Figs. 5 and 6 are detailed circuit diagrams and the respective block representations of power tubes employed in the invention.
Figure 6:
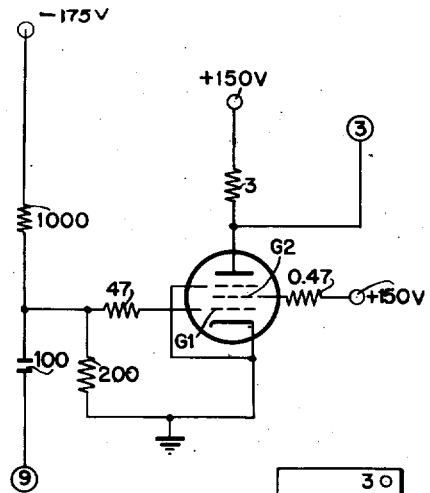
Figure 7:
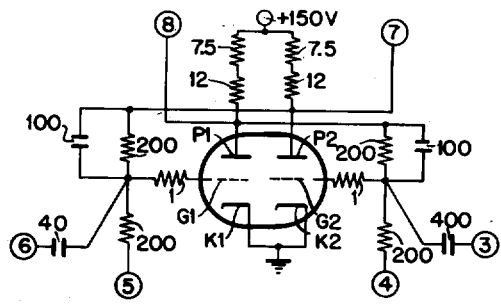
Figure 8:
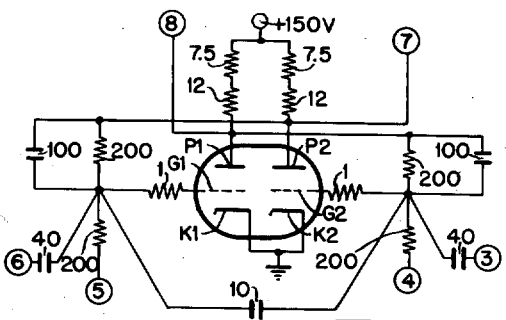
Figure 9:
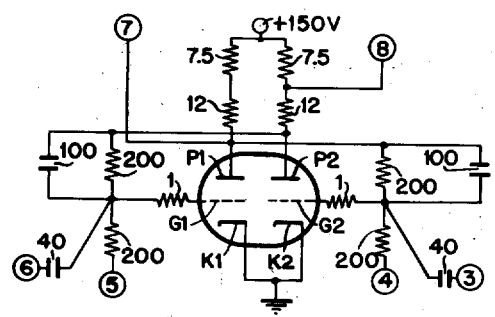

Referring to Figs. 5 and 6, power tube circuits are illustrated therein, designated as PW-2 and PW-7, respectively. A power tube is one which is capable of producing a power gain from an input signal with, however, a voltage inversion. The circuits shown in Figs. 5 and 6 include a pentode, which may be of the 6AQ5 type, with a grounded cathode, and a suppressor grid directly connected to the cathode. The grid G2 is connected, through a 0.47K ohm resistor, to a source of plus 150 volts. The plate is connected to a plus 150 volts power supply, through a 3K ohm resistor. Power tube PW-2 (Fig. 5) has an output terminal "4" connected to a movable tap on said 3K ohm resistor. The grid G1 is connected through a 47K ohm resistor, in series with a 330K ohm resistor, to a —100 volt negative bias supply. Grid G1 is also connected, through the same 47K ohm resistor, in series with a 390K ohm resistor, shunted by a 100 micro-microfarad condenser, to an input terminal "9."

Grid G1 of power tube PW-7 (Fig. 6) is connected through a 47K ohm resistor, in series with a 100 micro-microfarad condenser, to an input terminal "9." Grid G1 receives its negative bias through the same 47K ohm resistor, connected to a divider network comprising a 200K ohm resistor connected to ground, as shown, and a 1000K ohm resistor, connected to a source of —175 volts. An output terminal "3" is connected directly to the plate of power tube PW-7.

"And" circuit

When the plates of two inverters, which are negatively biased beyond cutoff, have a common plate resistor, the combined circuit, by using two separate inputs, can be an "And" circuit, as shown in Fig. 23. However the general term "And" circuit may refer to any circuit which requires the coincidence of a plurality of input signals to obtain one output signal. The value of the plate resistors are chosen so that the inverter tubes are operated on the portion of their characteristic curve where most of the voltage drop is across the load resistor and where changes in voltage at the plate are very slight, with a change in plate current. This means that the voltage at the commonly connected plates of Fig. 23 are essentially the same, and negative, whether one inverter tube is conducting or both are conducting. Only when neither inverter is conducting, do the commonly connected plates go positive.

A so-called negative "And" circuits makes use of this effect, by keeping the two inverters normally conducting, and applying positive voltages to the two inputs. Then in order to get a positive output, both inputs must go negative.

Basically, a negative "And" circuit acts like a pentagrid switch, in that it requires a coincidence of two inputs to obtain one output. The negative "And" circuit is a type of "And" circuit which differs from the pentagrid switch, in that it acts to produce a positive output signal, only upon a coincidence of two negative inputs, while the pentagrid switch acts, as previously described, to effect a negative output signal, only upon a coincidence of two positive inputs.

Figure 13:
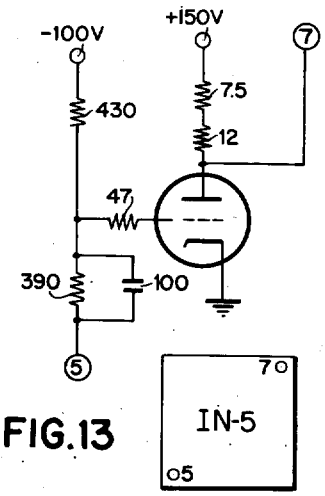
Figure 14:
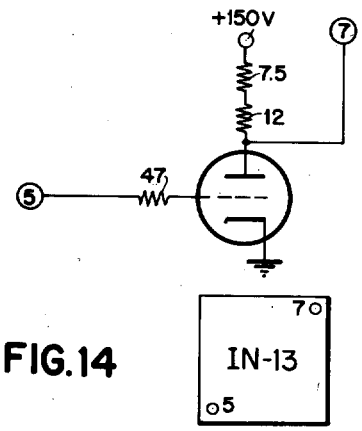
Figure 15:
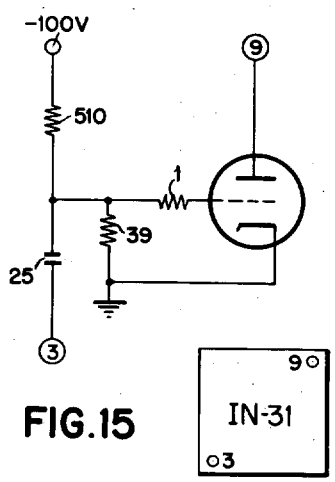
Figure 16:
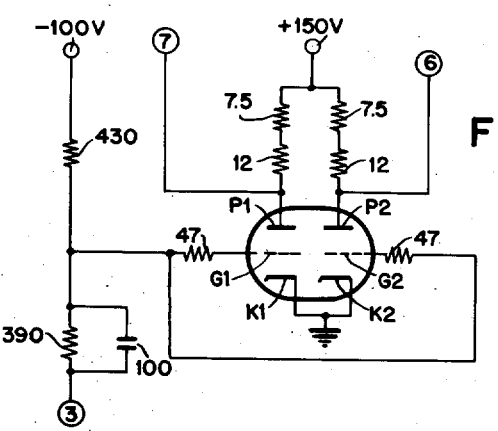
Figure 17:
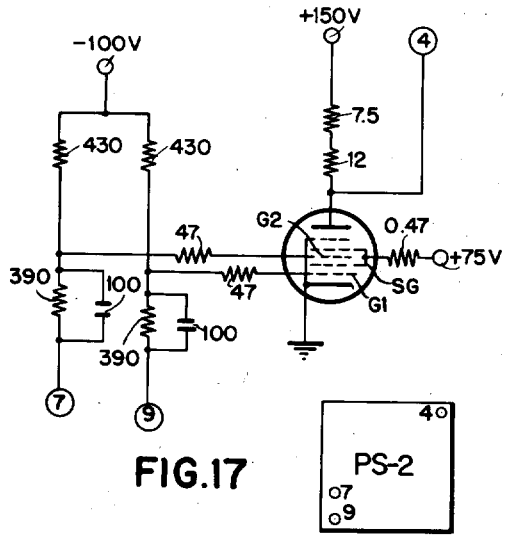
Figure 18:
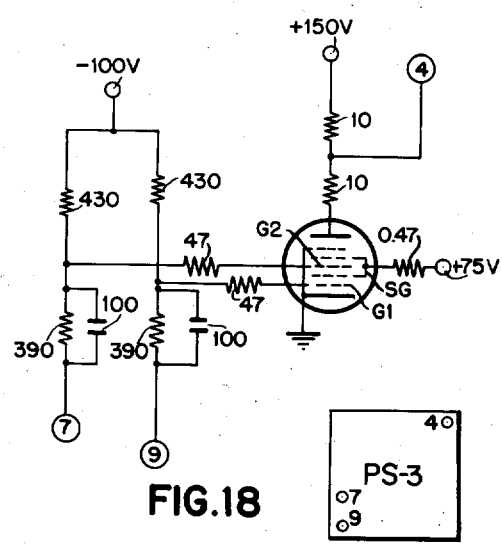

The negative "And" circuit disclosed in Fig. 23 has its block insignia labeled "&-5" and comprises the two triodes of a dual triode 6J6 type tube. The left hand triode comprises a type IN-5 inverter (Fig. 13). The right hand triode is similar to a type IN-5 inverter, except that its input terminal is labeled "3" and its output terminal "6," and it has no plate resistors. Output terminal "7" (Fig. 23) is conductively connected to output terminal "6," as shown.

While specific tube types and values of resistors and condensers have been defined in connection with the multivibrator, cathode follower, power tubes, triggers, inverters, & circuits, and switches, these are to be taken as exemplary only and the tube type and values may be varied, in accordance with the knowledge of those skilled in the art, without departing from the spirit of the invention.

Electronic calculator

Before proceeding to the operation of the novel high speed skip-circuit, per se, it is believed that a brief description of an electronic calculator which utilizes this invention, as a part thereof, will highlight the operation of the skip circuit. Basically, the calculator used is the one fully described in said patent to R. L. Palmer et al., with certain obvious changes necessary for direct incorporation of this invention into the calculator, as will be described specifically later.

The source of basic operating pulses for said calculator comprises a multivibrator, as described above, which supplies a series of so-called "A" pulses which are produced at the rate of 50 kc., and a series of so-called "B"

pulses, which are produced at the same rate, but 180° out of phase with the "A" pulses, as illustrated diagrammatically in Fig. 2. These pulses drive a primary timer circuit, which comprises a series of triggers, cascade connected in a "ring circuit," and so operated, that only one trigger will be On, at any one time, and all the others will be Off. The ring is reset, so that the first trigger of the ring is On and all the other triggers are Off. When successive "A" pulses are applied to the ring, the respective triggers are switched On, in succession, each preceding trigger being switched Off as the succeeding one is switched On.

The primary timer, which is a ring of 23 such triggers, has outputs from the various triggers which develop pulses (or voltage conditions) at certain times in the primary cycle. These are used for controlling gating circuits which are thereby permitted to transmit, a definite number of "A" or "B" pulses to a circuit element, or to operate a device directly.

The electronic calculator circuits comprise electronic counters, each consisting of a group of four cascade connected triggers interconnected to produce operations of the four triggers, out of their normal cascade operation, whereby the normal binary cascade operation of four triggers only is altered to decade operation, as shown basically in the patent to B. E. Phelps 2,584,811 issued February 5, 1952.

Several such counters, each including carry means, comprise a multi-ordered electronic accumulator. There may be any desirable number of counters in the accumulator, the accumulator of said Palmer et al. patent comprising 13 orders. The calculations, per se take place in the accumulator.

Storage devices are also provided which comprise similar electronic counters, sans carry means, such as a GS1 storage device, referred to particularly herein presently.

The main purpose of the electronic calculator of said Palmer et al. patent is to perform a series of repetitive calculations, starting with factors punched in successive record cards, with the various steps under control of manually plugged wiring. This calculator is employed for all types of calculations including addition, subtraction, multiplication and division, and series of calculations comprising various combinations of these specific types of calculation. To perform these various operations transfer of factors between the storage devices and the accumulator must be performed. A program ring of 20 steps is disclosed herein, to supply, to exit hubs, a series of output voltages, one step at a time, to be used in selecting the order of the functions to be performed by the calculator. Obviously, any desired number of exit hubs may be so employed.

The exit hubs which are connected by external plugging to selected function control hubs, are activated by the program ring, while the program ring has its basic timing controlled by the primary timer, so that the program ring steps from one program step to the next step, at the beginning of each such pimary timer cycle. If other controls, to be described presently, were not provided, the program exit hubs would be made active in succession, for a fixed length of time, with the program step transfers, from one to the next, occurring at the beginning of each primary timer cycle.

*Program ring*

Basically, the program ring comprises a ring of electronic triggers, each trigger comprising one step, and each trigger being formed by a pair of cross-coupled triodes (of the type generally as shown in the Overbeck Patent 2,404,918). The program ring illustrated and described presently, consists of 20 program steps (although any number of steps can be used), only one step being On, at any particular time. Upon simultaneous application of a pulse, to each of the triggers of the ring, as described in said Overbeck patent, the stage that is On, goes Off, and in going Off flips the next stage On. With each incoming pulse, the ring advances one step. The program ring differs slightly from that shown in said Overbeck patent, in that it is what is commonly referred to as an "open" electronic ring, that is, one that shuts itself off, at its end, rather than starting over again.

Figure 10:
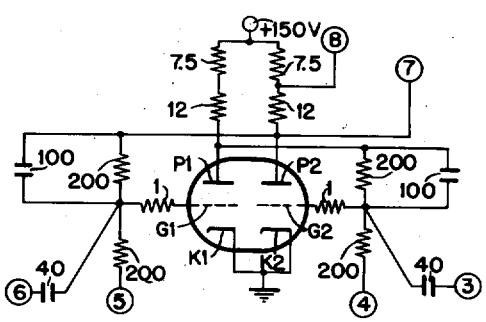
Figure 11:
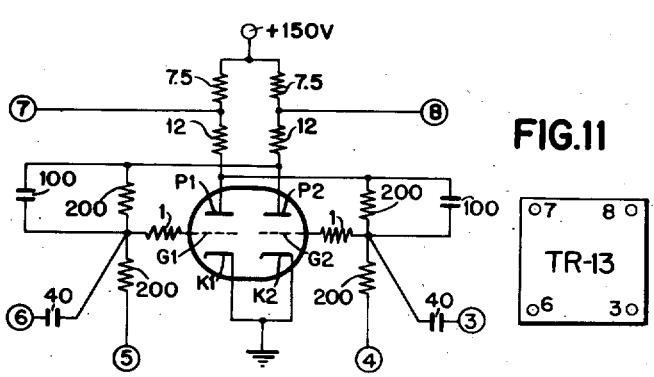
Figure 12:
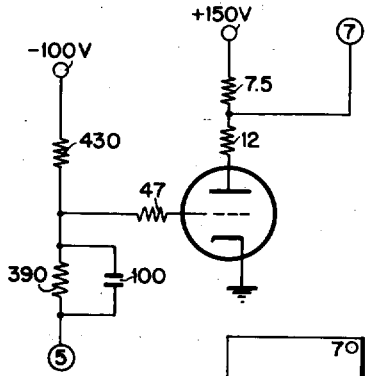

The program ring includes a home position trigger 11 (Fig. 1B) and twenty other triggers 12 to 31, inclusive. All the triggers are of type TR-4 (Fig. 10). Trigger 11 is reset On, before the start of calculation, while all the others are reset Off. Leads 41 to 60, respectively (Fig. 1B) connect the topped output terminals "8" (see also Fig. 10) of each of the triggers to the respective right hand input of the succeeding trigger, while lead 61 connects output terminal "8" of the last program trigger 31 to the left hand input of a trigger 63, which is a type TR-2 (Fig. 8) and which is called the Calculate Start-Stop trigger. An input lead 65, supplying negative pulses (from sources to be later described) is connected through leads 71 to 91, inclusive, to each of the respective left hand inputs of triggers 11 to 31, inclusive.

The first negative input pulse on line 65 acts via line 71 to turn Off the home position trigger 11, which as stated, has been initially reset On, but this pulse does not affect any of the other triggers, since they have all been reset Off. When trigger 11 goes Off, its plate P-2 (Fig. 10) goes negative, as previously described, and this negative swing is applied from its output terminal "8" via line 41 to the input terminal "3" of trigger 12, to thus turn this trigger On. The next pulse on line 65, acts via line 72, to turn Off trigger 12, which thus turns trigger 13 On. This stepping process continues, until the last trigger 31 goes Off, which, via line 61, and the terminal "6" of the Calculate Start-Stop trigger 63, turns it Off, thereby ending the program.

Leads 101 to 120, inclusive, respectively, connect the output terminals "7," respectively, of each of the triggers 12 to 31, inclusive, to inputs of several cathode followers. Home position trigger 11 is not connected to any cathode followers because no calculation is desired while the home position trigger 11 is On. In Fig. 1B, only the cathode followers which are connected to triggers 12, 21, 25 and 31, are shown, but it is to be understood that there are cathode followers connected to each of the triggers of the program ring. Lead 101 is connected to leads 125, 126 and 127, which are connected, respectively, to the inputs of cathode followers 128, 129 and 130, which are of the type CF-6 (Fig. 4). The output of these cathode followers are leads 131, 132 and 133, respectively, which are connected to the program exit hubs #1 labeled 134, 135 and 136, respectively. Three such program exit hubs are provided, for each and every program step.

The types of program functions which can be activated by the program exit hubs in the calculator, as described in said Palmer et al. application are Storage Read-In, Storage-Read-Out, Counter Read-In Plus, Counter Read-In Minus, Counter Read-Out, Counter Read-Out And Reset, Multiply, Divide and Balance Test.

In this list of the program functions, the reference to "Counter" is intended in the art to refer to an accumulator operation.

The novel means of the present invention also contemplate a new function to be known as "Skip" which will be described in detail presently.

*Primary timer*

The primary timer ring (Figs. 1A and 1B) comprises twenty-three triggers consecutively labeled "step 1" to "step 23" inclusive. Trigger "step 2" to trigger "step 23," are of the type TR-4 (Fig. 10). Trigger "step 1," is of the type TR-13 (Fig. 11) and its circuit connections are such that it is reset On while all the others are reset Off. Leads 150 to 171, inclusive, respectively, connect the right hand output of each of triggers "step 1" to "step 22," inclusive, to the right hand input of the succeeding trigger while lead 172 (Figs. 1B and 1A) closes the primary timer ring, by connecting the output terminal "8" of the last trigger "step 23" (Fig. 1B) to the right hand input of trigger "step 1" (Fig. 1A). An input lead 175 (Figs. 1A and 1B) supplied with negative pulses, is connected via leads 181 to 203, respectively, to each of the left hand inputs of all the twenty-three primary timer triggers. All the primary timer triggers are advanced in succession because of the interconnecting leads 150, 151, etc. in a manner similar to the advancement of the program ring.

A and B pulses

The source of high speed pulses used throughout the calculator comprises a multivibrator which will now be described. A multivibrator of the MV–1 type (Fig. 3) and labeled 220 (Fig. 1C) is provided as the source of these pulses. This multivibrator, as previously stated, produces approximately square topped pulses at its output terminal "9." Since this output of the multivibrator is not a true square wave, means are provided to shape the pulses into a square wave. This is done by means of triode clippers, which utilize only a portion of the waveform from the multivibrator to produce perfect square waves, all in a manner described in the above-identified Palmer et al. application.

For the proper operation of the calculator, it is necessary to have two pulse sources, displaced in time from each other. As stated above, these two trains of pulses are called "A" pulses and "B" pulses. Fig. 1C illustrates the necessary circuits for generating these "A" and "B" pulses. The operation is as follows:

The output terminal "9" of multivibrator 220 (Fig. 1C) is connected, in parallel, via a lead 221, to two IN–13 type inverters 222 and 223, respectively, having commonly connected input and output terminals. This parallel connection of inverters is known as the first clipper. The output of the first clipper is fed, via lead 225, to a second clipper, which comprises a type IN–36 inverter 226 (see also Fig. 16). The commonly connected outputs of this second clipper 226 is connected, via lead 228, to both a PW–7 type power tube 229 (see also Fig. 6) and to another IN–36 type, third clipper, 230. The commonly connected outputs of this third clipper 230 are connected via a lead 233, to another PW–7 type power tube 234.

The input to the first clipper 222 and 223 is derived from the output of the multivibrator 220 and each time a negative pulse appears at the input of the first clipper 222 and 223, a negative pulse also appears at the output of the second clipper 226 and a positive pulse appears at the output of the third clipper 230, and obviously with an initial positive pulse, the reverse is true.

Both the second and third clippers are capacitively coupled (see Fig. 6) to the normally conducting power tubes 229 and 234. Since such normally conducting tubes will recognize only negative pulses, the first power tube 229 will produce a positive output pulse, only when the output of the clipper 226 goes negative, and the power tube 234 will produce a positive output pulse, only when the output of the clipper 230 goes negative. The pulses produced by the first power tube at 9 lead 235, are known as "A" pulses, while the pulses produced by the second power tube at a lead 235 are known as "B" pulses. It is thus apparent that each time the input to the first clipper 222 and 223 goes negative, an "A" pulse is produced and that likewise each time the first clipper 222 and 223 input goes positive, a "B" pulse is produced. The timing of these "A" and "B" pulses is shown in Fig. 2. At 50 kc. operation, the "A" pulses (or "B" pulses) occur at 20 microsecond intervals and each pulse is of 10 microseconds duration. It is apparent then, that in any train of pulses, the "A" pulses always occur first, and the "B" pulses always occur next.

Pulse notation and primary cycle

As has been previously described, the home position of the primary timer ring is "step 1" (Fig. 1A), while the last position is "step 23" (Fig. 1B). Each time the primary timer advances, from "step 23" back to "step 1," one cycle of operation is completed. Thus, a group of 23 successive pulses constitutes one electronic cycle, known as the primary cycle. Each such cycle of the calculator can thus be considered to be divided into 23 cycle points. Thus, when the primary timer is reset to normal, the calculator is at 1. When trigger "step 2," is On, the calculator is at 2, and when trigger "step 12" is On, the calculator is at 12, etc.

In order to simplify electronic timing terminology, a reference notation has been set up which uses the suffixes of "A" and "B." As previously described, "A" pulses are always produced first, at the input of the first clipper 222 and 223 (Fig. 1C), and "B" pulses are always produced next. Therefore, as can be seen in Fig. 2, between successive "A" pulses, there is always a "B" pulse.

Since the primary timer is advanced by "A" pulses, each step may be suffixed by the letter "A," to refer to a particular cycle point. Thus, when the primary timer is reset to normal, the calculator is said to be at 1A. Then, as can be seen in Fig. 2, the next "A" pulse advances the timer to 2A, etc. Between 1A and 2A, there is a "B" pulse known as 1B, and between 2A and 3A, there is a pulse 2B, etc.

A pulse lasting from the beginning of one "A" pulse to the beginning of the next "A" pulse is called an AB pulse. An AB pulse, therefore, includes both an "A" pulse and a "B" pulse. Since the primary timer advances on successive "A" pulses, any one step will be On, from the receipt of one "A" pulse until the receipt of the next "A" pulse. Consequently, the primary timer advances in AB steps and the primary timer ring triggers produce AB pulses. The On sides of the ring triggers produce −AB pulses, while the Off sides produce +AB pulses. All pulse notations are preceded by a plus or minus sign to indicate whether the pulse is a positive pulse or a negative pulse.

The term "gate" is used to signify a duration, from one cycle point to another. A positive pulse, lasting from 3A to 8B is abbreviated +(3A–8B)G. A train of pulses is suffixed by the letter P rather than G. Thus a series of +B pulses occurring between 11B and 19B is abbreviated +(11B–19B)P.

Primary timer controlled pulses

Various gating pulses and trains of pulses are developed, under control of the primary timer as is described in detail in said above mentioned Palmer et al. patent. These gates and pulses control sub-program operations within the program functions. Briefly, the more pertinent sub-program operations will be summarized here.

When primary timer trigger "step 2," goes On, its terminal "7" goes positive and applies a +2AB pulse via a lead 238 (Figs. 1A and 1B) to the grid 1 input terminal "9" of a PS–2 type switch 239. The grid 2 input terminal "7" of switch 239 is fed +B pulses from the above described line 236. The switch 239 will thus conduct at 2B time only, at which time it will apply a −2B pulse via a lead 240 to an IN–5 type inverter 241. Inverter 241 inverts the pulse and applies it via a lead 242 to a type PW–2 power tube 243. The power tube 243 acts to increase the power output and invert the pulse which becomes a −2B input pulse applied via lead 65, to advance the program ring, as described above. The −2B pulse is shown in the timing diagram, Fig. 2.

A +(3A–8B)G pulse, called a "gate," as stated above, is used in the electronic reset circuit. The circuit for producing this gate is shown in Fig. 1A and comprises a TR–4 type trigger 255 feeding to an output lead 254 via line 257. This trigger is turned On, at 3A time by the step 3 trigger via line 260 and inverter 256 via line 257, and is turned Off by a —8B pulse produced by the step 8 trigger via line 267 and power tube 265 via line 266. This —8B pulse is produced by mixing, in switch 265, a +8AB pulse, from the Off side of the primary timer trigger "step 8," and +B pulses, fed to PS–3 via lead 268.

A circuit for developing a +(10A) pulse on lead 275 (Fig. 1A) comprises the "step 10" trigger, switch 290 and inverter 291 on whose output lead 275 the +(10A) pulse is produced, as described in said Palmer et al application. This +10A pulse is shown in Fig. 2.

A circuit for developing a train of pulses labeled +(11B–19B)P is shown in Figs. 1A and 1B comprising the "step 11" trigger, the trigger 292, switch 293 and inverter 294 on whose output line 276 this pulse is produced under control of the "step 20" trigger, controlled by the "step 19" trigger acting via inverter 295, as described in said above-identified Palmer et al. patent, while a "gate" +(20B–1A)G is produced on the output line 277 of a trigger 296 (Fig. 1B) under control of the "step 1" trigger, line 277a, and the "step 20" trigger acting via switch 297.

These gates and pulses are available, at the times described, in order to control the order of operation within an electronic cycle, each of the above-mentioned program steps being equal to one electronic cycle of the primary timer. During this electronic cycle, certain selected operations or subprograms can occur, for example, Reset, Add-Subtract Control, Transfer, and Carry.

If the particular program function plugged to the program requires a Reset operation, this Reset occurs, after the new program step is initiated at 2B time, the Reset operation beginning at 3A time and being controlled by the "gate" +(3A–8B)G. During this Reset time, either a storage unit or the accumulator may be reset.

The pulses +(10A)P, the +(11B–19B)P, and the gate +(20B–1A)G are utilized for Add-Subtract Control Transfer and Carry. During Add-Subtract Control time, a determination is made as to whether the factor being read into the accumulator should be entered in True or in Complement form.

During the Transfer portion of the cycle, electronic Transfer between the storage units and the accumulator or vice versa, takes place, and the +(11B–19B)P pulses are used, in combination with a "gate" to select the required number of pulses, to be transferred.

All Carry operations in the accumulator take place during the carry portion of the cycle.

As an example, of the Reset operation, it is always necessary, before reading into a storage unit, to Reset that storage unit, so that the first operation in a storage Read-In function, is a Resetting of the storage unit, by a +(3A–8B)G "gate."

The Reset circuit is illustrated in Fig. 1C. Upon application of a positive voltage, from a program "exit" hub to a GS1 Read-In hub labeled 300, this positive voltage is applied to terminal "6" of a PS–8 type switch 301, to condition its grid 1, so that the +(3A–8B)G "gate" received over lead 254, will cause switch 301 to conduct, which applies a pulse to an inverter 302 which then acts on the Reset circuit comprising the multigrid tube 303 and the pentode 304, as described in said Palmer et al. patent, to cause the —100 volt Reset terminal 10 to rise to ground potential. This relatively positive pulse is applied, to all the Reset terminals of General Storage GS1 triggers (see terminal "4," Fig. 8, for example), to reset the triggers Off, as described above.

Operations such as Add-Subtract Control Transfer, and Carry always occur later, in any particular electronic cycle, than does Reset, since Reset always starts at 3A time. Reset, therefore, is the earliest operation which takes place and it is to be noted it is Reset, which times the initiation of the "active" part of a cycle.

Since the program ring is advanced at 2B time, if, as described presently, the primary timer trigger "step 3" is not turned On because means are provided for suspending the ring at inactive "step 2," rather than proceeding to "step 3" which is in the "active" part of the cycle, then the program ring can be rapidly advanced past program steps, under control of multivibrator pulses, without performing the particular function allocated to those program steps. This is accomplished under control of a circuit which will now be described.

*Skip control*

The above mentioned negative input lead 175 (Fig. 1A) for advancing the primary timer ring, is connected to the output terminal of a PW–2 type power tube 320 whose input terminal is connected via lead 321 to the output terminals of an "&–5" type "And" circuit 322. The right hand input terminal "3" of "And" circuit 322 is connected via a lead 323 to the right hand output of a TR–1 type, Skip trigger 324. The Skip trigger 324 is normally reset Off, prior to initiation of a new calculation and, therefore, the right hand output of trigger 324 is negative. This negative potential is applied to condition "And" circuit 322. The left hand input terminal "5" of "And" circuit 322 is connected, via a lead 325, to a PS–2 type switch 326. Its grid 2 input terminal "7" is supplied with plus "A" pulses, via the previously described lead 235. Grid 1 input terminal "9" of this switch is connected via a lead 327 (Figs. 1A and 1B) to the right hand output terminal "7" of the Calculate Start-Stop trigger 63 (Fig. 1B).

When it is desired to start calculating, this Calculate Start-Stop trigger 63 (Fig. 1B) is reset On by applying a cam produced pulse to input terminal "5" (see Fig. 8) as described in detail in said Palmer et al. patent. The positive voltage which is thus produced at terminal "7" is applied via the lead 327 (Figs. 1B and 1A) to condition grid 1 of switch 326 (Fig. 1A) to allow the plus "A" pulses from lead 235 to pass through switch 326 and become —A pulses. The —"A" pulses are inverted by the conditioned "And" circuit 322 and reinverted by power tube 320 to start advancing the primary timer ring. As stated above, at the end of the program, the Calculate Start-Stop trigger 63 is turned Off via line 61 (Fig. 1B) which thus produces minus at terminal "7," which is applied, via lead 327, to the grid 1 of switch 326 (Fig. 1A), to thereby block the positive pulses from lead 235 passing through switch 326 and the primary ring is stopped. Prior to initiation of another calculation, the primary ring is reset, as described above.

It has been shown that —A pulses pass through the conditioned "And" circuit 322 to advance the primary timer ring. It can thus be seen that if "And" circuit 322 were not conditioned the primary timer ring would not advance. This is accomplished very simply by turning On the Skip trigger 324 and thus applying a positive potential on the input terminal 3 of "And" circuit 322.

Connected to the right hand input of Skip trigger 324, via a lead 330, is a Skip On PS–7 type switch 331. Its grid 2 terminal "9" is connected to lead 236 from the source of plus B pulses. Grid 1 input terminal "6" of this switch is connected via a lead 332 to Skip On hubs 333.

Assume that a Skip operation is to start, on program step 10. In that case, a wire would be plugged, from one of the program hubs #10 in Fig. 1B to the Skip On hubs 333, Fig. 1A. At 2B time, of program step 10, a positive voltage (plus 2B) will be applied, from the program hubs #10 through the Skip On hubs 333 and via lead 332, to condition grid 1 of switch 331. With grid 1 conditioned, a plus B pulse, on grid 2, via lead 236 will cause switch 331 to conduct and thus apply a negative pulse, via lead 330, to turn On the Skip trigger 324.

Since it was a 2B pulse, which turned On the Skip trigger and blocked further pulses from advancing the primary timer ring, the primary timer ring cannot advance to its "step 3" so that the active portion, of the electronic cycle, will remain suspended on "step 2."

Terminal "7" of primary timer trigger "step 2" will remain positive to thus continuously condition the grid 1 input of switch 239 (Fig. 1B). Thus, plus B pulses to the grid 2 input of switch 239 will pass through inverter 241, power tube 243 and the lead 65, to advance the program ring. The program ring will continue to advance at this increased rate, until the primary timer ring is advanced from "step 2," as described below.

Connected to the left hand input of Skip trigger 324, via a lead 335, is a Skip Off PS–7 type switch 336. Its grid 2 terminal "9" is connected to lead 236, from the source of plus B pulses. Grid 1 input terminal "6" of this switch is connected, via a lead 337, to Skip Off hubs 338.

Assume that a Skip operation is to end and calculating is to resume on program step 14. In that case, a wire would be plugged from one of the program hubs #14 in Fig. 1B to the Skip Off hubs 338, Fig. 1A. At 2B time, of program step 14, a positive voltage (plus 2B pulse) will be applied from the program hubs #14 to the Skip Off hubs 338 and, via lead 337, to condition grid 1 of switch 336. With grid 1 conditioned, a plus B pulse, on grid 2 via lead 236, will cause switch 336 to conduct and thus apply a negative pulse, via lead 335, to turn Off the Skip trigger 324.

With the Skip trigger 324 turned Off, the primary timer ring will no longer remain suspended on "step 2" but as described above, will advance to "step 3" in the active portion of the electronic cycle. Thus, terminal "7" of primary timer trigger "step 2" goes negative, which effectively blocks switch 239 (Fig. 1B) to prevent any further plus B pulses from passing through to advance the program ring at the previously described increased rate.

To summarize the operation of the High Speed Skip circuit, it is now seen that with Skip trigger 324 (Fig. 1A) Off, "A" pulses advance the primary timer ring, which in turn control the advancement of the program ring. Each time the primary timer is advanced to trigger "step 2," switch 239 (Fig. 1B) is conditioned, to thus allow "B" pulses to advance the program ring one step for each full operation of the primary timer ring, and one step only. Turning On the Skip trigger 324 (Fig. 1A) at 2B time, blocks "A" pulses from advancing the primary timer so that the switch 239 (Fig. 1B) remains conditioned by trigger "step 2" to thus permit any further "B" pulses to advance the program ring one step for each such "B" pulse and therefore at a greatly increased rate. Since the primary timer is suspended, on inactive trigger "step 2," during this rapid advancement of the program ring, the active portion of the cycle is not entered and actual Skipping of program steps is thus accomplished; Skipping consisting of rapidly advancing past program steps, without performing the particular functions allocated to those program steps.

While there has been described novel means for producing rapid skipping of several steps of a program under direct control of plug wiring, it can be understood that the skipping may be performed or not performed as a result of tests such as those described in said above mentioned Palmer et al. patent. Such tests may include Balance tests, Zero tests, etc. It is thus seen that there is disclosed a very flexible calculator program unit.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A commutator comprising a first and second ring of bistable elements, said elements individually operable to an On or Off condition and only one of said elements in each ring being set to an On condition at any one time, a source of pulses, means under control of said source of pulses for stepping the On condition in said first ring, with each pulse from a preceding element to a succeeding element, means for stepping, at one speed, the On condition in said second ring from a preceding element to a succeeding element, each time the On condition has progressed through a complete cycle of said first ring, means for selectively suspending the stepping of the first ring, means for stepping the On condition in the second ring at another speed under control of said source of pulses while said first ring is suspended, and means for selectively ending the suspending of the stepping of the first ring to continue the stepping of the On condition in said second ring at said one speed.

2. A commutator comprising a first and second ring of bistable elements, said elements individually operable to an On or Off condition and only one of said elements in each ring being set to an On condition at any one time, a source of pulses, means under control of said source of pulses for stepping the On condition in said first ring, with each pulse, from a preceding element to a succeeding element, means for stepping, at one speed, the On condition in said second ring from a preceding element to a succeeding element, each time the On condition has progressed through a complete cycle of said first ring, means for suspending the stepping of the first ring, said suspending means comprising an And circuit operable to pass or not pass pulses from said source of pulses to said first ring, and means for stepping the second ring at another speed under control of said source of pulses.

3. A commutator as in claim 2, and a skip trigger for selectively rendering said And circuit operable by one of the On and Off conditions of said skip trigger.

4. A commutator as in claim 3, and means responsive to a test indication for operating said skip trigger.

5. In a calculator adapted to solve problems through the performance of successively programmed arithmetic steps, a program system comprising, in combination, a plurality of sub-program means, each of which when actuated performs a particular portion of an arithmetic step in a problem to be solved by said calculator, a plurality of program function means, each of which, when actuated, controls the performance of a particular step in a problem by selecting and regulating said sub-program means for actuation a source of pulses, a first ring of bistable elements, said first ring of elements being connected in groups to any one of said sub-program operation means, circuit means connected to said first ring for applying said pulses to said first ring to initiate sequential individual operations of said bistable elements, said elements of said first ring, when operated, actuating the sub-program operation means to which they are respectively connected, a second ring of bistable elements, each of said second ring elements being selectively connected to a program function means, said second ring also being selectively connected to one of the elements of said first ring whereby the operation of said one element initiates sequential individual operations of said second ring bistable elements, said one element being normally operated once for every cycle of the first ring, said elements of said second ring when operated, actuating the program function means to which they are respectively connected, means for selectively disconnecting said first ring from said circuit means to disable the sub-program means, and means for simultaneously connecting said source of pulses to said second ring for applying said pulses to said second ring to more rapidly initiate sequential individual operations of said second ring bistable elements to effect rapid skipping of said problem steps by rapidly advancing through said problem steps without performing the sub-program operations within said problem steps.

6. A calculator as in claim 5, said disconnecting means comprising an And circuit operable to pass or not pass said pulses from said source of pulses.

7. A calculator as in claim 6 and including a skip trigger for selectively rendering said And circuit operable by one of the On and Off conditions of said skip trigger.

8. A calculator as in claim 7, and means operating said skip trigger.

9. A calculator as in claim 7, and means responsive to a test indication in a previous problem step for operating said skip trigger.

10. In a calculator adapted to solve problems through the performance of successively programmed arithmetic steps, a program system comprising in combination, a plurality of sub-program operation means, each of which, when actuated, performs a particular portion of an arithmetic step in a problem to be solved by said calculator, a plurality of program function means, each of which, when actuated, controls the performance of a particular step in a problem by selecting and regulating said sub-program means for actuation, a source of pulses, a first ring of bistable elements, said first ring elements being connected in groups to any one of said sub-program operation means, first circuit means connected to said first ring for applying said pulses to said first ring to initiate sequential individual operations of said bistable elements, said bistable elements of said first ring, when operated, actuating the sub-program operation means to which they are respectively connected, an And circuit a second ring of bistable elements, each of said second ring elements being selectively connected to a program function means, second circuit means selectively connecting one of the elements of said first ring to said second ring whereby the operation of said one element permits a pulse from the source of pulses to initiate sequential individual operations of said second ring bistable elements, said one element being normally operated, once for every cycle of the first ring, said elements of said second ring when operated, actuating the program function means to which they are respectively connected, means for selectively disconnecting said first ring from said first circuit means to disable said sub-program means, said first ring being in the position where its one element is continuously operating, to permit pulses from the source of pulses to more rapidly initiate sequential individual operations of said second ring bistable elements to effect rapid skidding of said problem steps by rapidly advancing through said problem steps without performing the sub-program operations within said problem steps.

11. In a calculator, adapted to solve problems through the performance of successively programmed arithmetic steps, a program system comprising in combination, a source of pulses, a first ring of bistable elements, circuit means connected to said first ring for applying said pulses to said first ring to initiate sequential individual operations of said bistable elements, a second ring of bistable elements, selectively connected to one of the elements of said first ring whereby the operation of said one element initiates sequential individual operations of said second ring bistable elements, said one element being normally operated once for every cycle of the first ring, a plurality of program function means controlled by individual elements of said second ring for controlling the order of arithmetic steps of problems to be solved by the calculator, a plurality of sub-program means controlled by groups of elements in an active portion of the first ring for controlling the order of operations constituting each problem step, said one element not being in the active portion of the first ring, means for selectively disconnecting said circuit means from said first ring while said first ring is in its inactive portion to disable the sub-program means, and means for simultaneously connecting said source of pulses to said second ring for applying said pulses to said second ring to more rapidly initiate sequential individual operations of said second ring trigger elements to effect skipping of said problem step by advancing through said problem steps without performing the sub-program operations within said problem steps.

12. In combination, a first ring of bistable elements, a source of pulses, a first circuit means operative when conditioned to connect said source of pulses to said first ring, skip means selectively operable to condition said first circuit means for transmission of the pulses, means including the transmitted pulses for driving said first ring by sequentially placing each of said first ring elements in a momentarily operative condition, a second ring of bistable elements, second circuit means operative when conditioned to connect said source of pulses to said second ring, means connecting one element of said first ring to said second circuit means, said first ring one element in the momentary operative condition conditioning said second circuit means only long enough to permit the transmission of one pulse to said second ring, means including the transmitted pulses for driving said second ring, each pulse causing the second ring elements to be individually operated in sequence, and means for selectively operating said skip means to remove the conditioning of the first circuit means at the time said first ring one element is operative, thereby prolonging the time of the operative condition of said first ring one element and permitting the transmission of more than one pulse to said second ring.

13. In combination, a first ring of bistable elements, a source of pulses, a first circuit means operative when conditioned to connect said source of pulses to said first ring, skip means selectively operable to condition said first circuit means for transmission of the pulses, means including the transmitted pulses for driving said first ring by sequentially individually placing said first ring elements in a momentarily operative condition, a second ring of bistable elements, second circuit means operative when conditioned to connect said source of pulses to said second ring, means connecting one element of said first ring to said second circuit means, means including the pulses from said source of pulses for driving said second ring by causing the second ring elements to be individually operated in sequence, said first ring one element in the momentary operative condition thereof conditioning said second circuit means only long enough to cause one of said second ring elements to be operative, and means for selectively operating said skip means to remove the conditioning of the first circuit means at the time said first ring one element is operative, thereby prolonging the time of the operative condition of said first ring one element and permitting the rapid sequential operation of more than one of the second ring elements.

References Cited in the file of this patent

UNITED STATES PATENTS 2,442,428  Mumma _____ June 1, 1948